(12) United States Patent
Duquette

(10) Patent No.: US 6,532,146 B1
(45) Date of Patent: Mar. 11, 2003

(54) COMPUTER DISPLAY DEVICE WITH DUAL LATERAL SLIDE-OUT SCREENS

(75) Inventor: Daniel Louis Duquette, Tustin, CA (US)

(73) Assignee: Slide View Corp., Tustin, CA (US)

( * ) Notice: Subject to any disclaimer, the term of this patent is extended or adjusted under 35 U.S.C. 154(b) by 0 days.

(21) Appl. No.: 10/057,035

(22) Filed: Jan. 23, 2002

(51) Int. Cl.⁷ ................................................ G06F 1/16
(52) U.S. Cl. ........................... 361/681; 361/683; 345/1
(58) Field of Search ................................ 361/683, 681, 361/686; 345/1, 3, 4, 5

(56) References Cited

U.S. PATENT DOCUMENTS

| | | |
|---|---|---|
| 4,884,068 A | 11/1989 | Matheny et al. |
| 4,988,995 A | 1/1991 | Buisson et al. |
| 5,467,102 A | 11/1995 | Kuno et al. |
| 5,590,021 A | 12/1996 | Register |
| 5,694,141 A | 12/1997 | Chee |
| D395,041 S | 6/1998 | Leveridge et al. |
| 5,768,096 A * | 6/1998 | Williams et al. ............ 361/681 |
| 5,796,577 A | 8/1998 | Ouchi et al. |
| D397,998 S | 9/1998 | Ambroe |
| 5,900,848 A | 5/1999 | Haneda et al. |
| 5,949,643 A | 9/1999 | Batio |
| 6,151,401 A * | 11/2000 | Annaratone ............... 381/388 |
| RE36,978 E | 12/2000 | Moscovitch |
| 6,215,459 B1 | 4/2001 | Reddy et al. |
| 6,222,507 B1 | 4/2001 | Gouko |

FOREIGN PATENT DOCUMENTS

| | | |
|---|---|---|
| WO | WO 96/41328 | 12/1996 |

* cited by examiner

*Primary Examiner*—Darren Schuberg
*Assistant Examiner*—Yean-Hsi Chang
(74) *Attorney, Agent, or Firm*—Gene Scott-Patent Law & Venture Group

(57) ABSTRACT

A display apparatus comprises a device enclosure supporting a front panel and a monitor housing supporting a first monitor screen. The monitor housing is pivotally engaged with the device enclosure, and enabled for pivotal movement between a closed position wherein the first monitor screen is approximately parallel to the front panel, and an open position, placing the first monitor screen at an angle to the front panel. A sliding assembly supports plural further monitor screens. The further monitor screens are enabled for sliding movement between concealed positions within the monitor housing and viewing positions lateral to the monitor housing. The further monitor screens are further enabled, when placed in their viewing positions, for pivotal movement relative to the monitor assembly for improved viewing, jointly, of the plural screens.

8 Claims, 8 Drawing Sheets

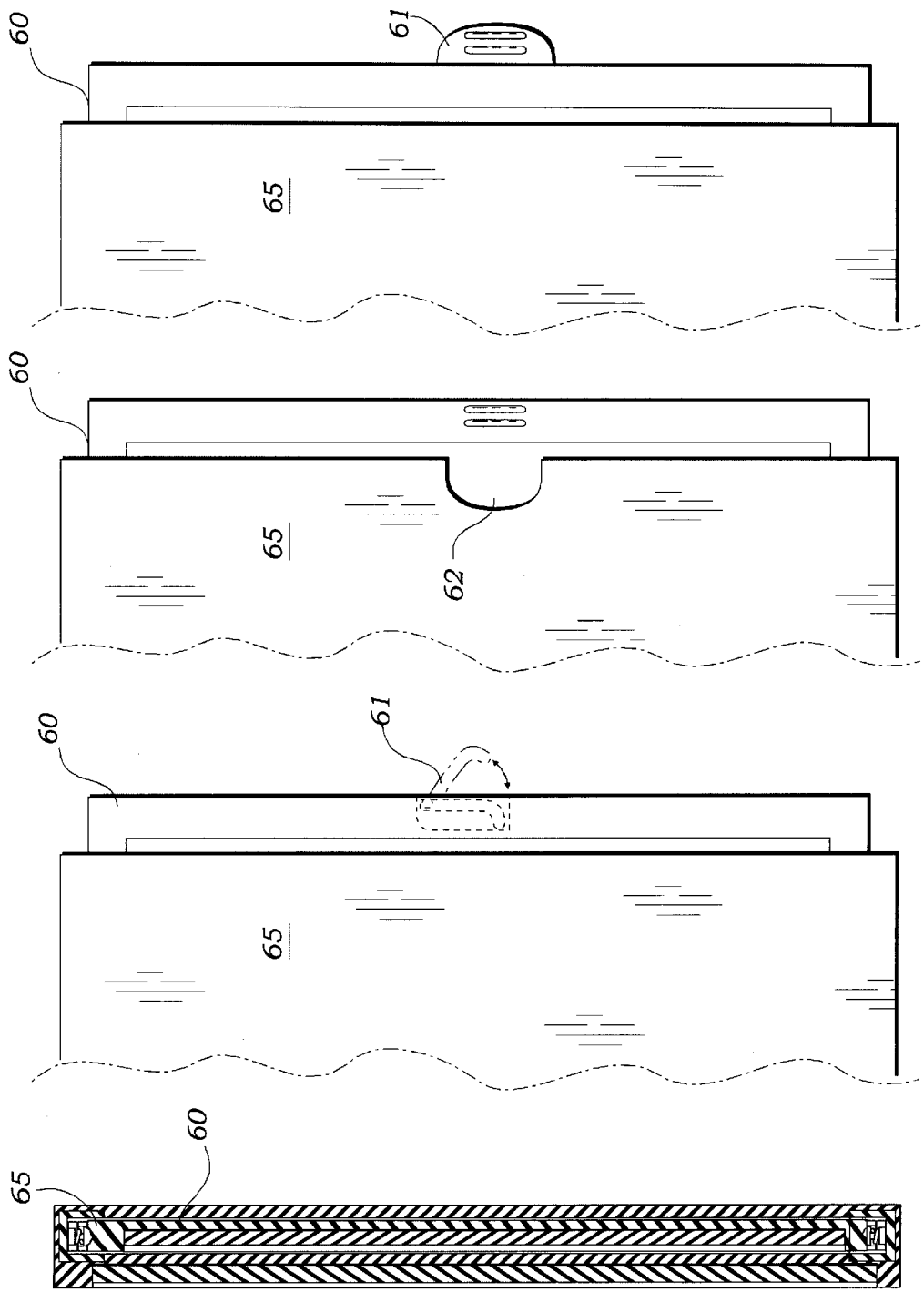

COMPUTER DISPLAY DEVICE WITH DUAL LATERAL SLIDE-OUT SCREENS

BACKGROUND OF THE INVENTION

1. Field of the Invention

This invention relates generally to portable computers such as laptop models and more particularly to a portable computer with a primary monitor screen and additionally one or two farther laterally slide-out monitor screens with side-by-side viewing and storage of the slide-out screens behind the primary screen.

2. Description of Related Art

The following art defines the present state of this field:

Leveridge et al., U.S. Pat. No. D395,041 describes a computer monitor assembly design.

Ambroe, U.S. Pat. No. D397,998 describes a closable display device design.

Moscovitch, U.S. Pat. No. RE36,978 describes a display system including a base, a pair of electronic displays, and an arm assembly that supports the displays from the base in vertical or horizontal registration. In one implementation, the arm assembly is a single telescopic member that rotates relative to the base and locks in vertical and horizontal orientations, the displays rotate relative to the member between corresponding extreme angular positions in which the operative angular orientation of the displays relative to horizontal is maintained, and the length of the member is adjusted to minimize separation of the displays. In another implementation, the arm assembly has separate arms rotating about vertically spaced axes and linked to minimize the separation of the displays automatically when vertically or horizontally registered. In a simple implementation, the arm assembly is a rigid arm that releasably attaches to the base only in vertical and horizontal orientations, the displays mounted releasably to the arm in pre-defined angular orientations that preserve their operative angular orientation, and one display can be connected to the arm at spaced apart position to adjust separation of the displays.

Matheny et al., U.S. Pat. No. 4,884,068 describes a multiple display system having a single light pen made to operate with a plurality of synchronized monitors in an array. A determination of which monitor in the array the light pen is being used with, is made to allow simultaneous usage of the light pen on any of the monitors in the array. Other positioning or pointing input devices can be arranged to work with the array of monitors.

Buisson et al., U.S. Pat. No. 4,988,995 describes a display device including several flat screens. Two sides of a case each form a flat screen display face controlled by the same control system. Under normal operation, the case is held in slides and only the screen disposed on one side is visible and in the emergency mode the case is pulled out of the slides and is pivoted so as to cause the other screen disposed on the other side to appear.

Kuno et al., U.S. Pat. No. 5,467,102 describes a portable display device capable of presenting a document in an easy to read format, in which a simultaneous display of different parts of the document in reasonable sizes can be made, by a simple operation of the device. The display device comprises a document memory for storing documents to be displayed, at least two display screens for displaying the documents stored in the document memory means, and a display control unit for controlling displays of the documents on the display screens to be in a linked mode in which the displays on the display screens are linked together and in a separate mode in which the displays on the display screens are independent from each other.

Register, U.S. Pat. No. 5,590,021 describes an apparatus and method for a secondary display system for a computer. A secondary display system of the present invention includes a flat panel display configured such that the display is conveniently located both during and between use thereof. The system comprises a liquid crystal display module (LCDM), a corresponding display controller connected to the LCDM via an appropriate interface, and a mounting device connected to the LCDM for mounting and positioning the LCDM in close proximity to the monitor of a computer. In a preferred embodiment, the mounting device comprises a rectangular plate, which is horizontally disposed between a chassis and a monitor of the computer, and the positioning means comprises a single axis hinge, which is connected to a front corner of the plate such that the hinge rotates on a vertical axis. One edge of the LCDM is attached to the hinge so that the LCDM may be rotated on a vertical axis. During use, the LCDM may be rotated such that its display screen is coplanar with the display screen of the monitor. Between uses, the LCDM may be rotated such that its display screen is substantially orthogonal to the display screen of the monitor.

Ouchi et al, U.S. Pat. No. 5,796,577 describes a notebook computer comprising a keyboard positioned on the upper surface of a computer body, an operating ball, function keys and the like. A cover member fixed to the computer body by a hinge so that it opens and closes against the computer body is supported in an open position substantially perpendicular to the body. A first display device is formed on the inner surface of the cover member, and a second display device is formed on the outer surface thereof. The operator and the client facing each other with the notebook computer positioned between them could share the same screen information by watching each of the two display devices in front of them.

Chee, U.S. Pat. No. 5,694,141 describes a computer system including a pair of display devices, such as cathode ray tubes (CRT's) or liquid crystal displays (LCD's) for providing a visible display to a user of the computer system. The computer system includes a video display controller (VDC) providing for simultaneous display of different images on the pair of display devices. The VDC includes a display data processing circuit (DDPC) which is variably configurable to provide decoding of data words from a first bit-word format as received from a display first-in-first-out (FIFO) memory to a second bit-word format as required by a particular one of the pair of display devices. The DDPC is variably configurable to allow the pair of display devices to each receive driving signals providing the simultaneous differing images, and which driving signals originate with the bit-words allocated to each particular one of the pair of display devices. Accordingly, the DDPC simultaneously decodes bit-words from the first bit-word format to a pair of second bit-word formats, which second bit-word formats need not be the same, but can differ depending on the type of display device receiving the corresponding driving signals.

Haneda et al., U.S. Pat. No. 5,90,848 describes an information processing apparatus having a main body and a lid body configured so that the lid body can be switched between a closed state, a stacked state, a double screen state and an inverted state. Each of the main body and the lid body has a display section for displaying information and an input section composed of a transparent tablet and provided on the display section. As a sensor or the like detects the lid body in one of the four states, a control section of the information processing apparatus controls the display section so that a screen on the display section is appropriate to the detected state of the lid body. The control section also controls the lighting section for lighting the display section appropriately to the detected state of the lid body. This realizes appropriate display in accordance with usages of the information processing apparatus and offers an easy-to-operate and easy-to-use information processing apparatus. Besides, the lighting section is turned on/off according to needs, and therefore it is possible to prevent heat generation and to restrain power consumption.

Batio, U.S. Pat. No. 5,949,643 describes a retrofitting, folding, portable keyboard for a notebook computer consisting of two, pivotally-hinged halves. The two halves are hinged so that may be assume a perfectly flat, horizontal position, or, alternatively, a laterally raised and sloping configuration that provides an enhanced, ergonometric configuration to the user. Each half has its own set of keys and space bar. The keyboard of the invention has its own pointing device that takes over the pointing function of the pointing device of the dedicated keyboard provided with the notebook computer. The portable, folding keyboard of the invention also has a joystick-adapter by which a conventional joystick may be operatively coupled to the notebook computer by which games may be played. Four, bottom, pivotal feet support the keyboard on and/or above the existing keyboard provided with the notebook computer. A carrying case is provided in which the folded-up keyboard may be stored and transported. Also provided is a dual split screen, where each half of the split screen is pivotally mounted for universal rotation.

Reddy et al., U.S. Pat. No. 6,215,459 describes a video controller for controlling at least two video displays incorporating a video memory for storing first and second video frames of interleaved pixel data. A video memory controller connected to the video memory sequentially reads data for a first pixel from the first video frame and data for a second pixel from the second video frame. Each pixel data is in turn transferred to a look-up table connected to the video memory controller which converts the first and second pixel data to first and second display data. A selector coupled to the look-up table alternately routes the first display data to one video. display and routes the second display data to the other video display.

Gouko, U.S. Pat. No. 6,222,507 describes a personal computer which displays a plurality of images and which includes a body of the personal computer, a primary display panel provided on a front side of the body, and a secondary display panel provided adjacently to the primary display panel, the secondary display panel is slid to be contained into the primary display panel or outer sides of the primary display panel by the use of rack and pinion mechanism. The secondary display panel is rotatable towards both upper or lower side and left or right side with respect to the primary display panel by a hinge mechanism.

Chee et al., WO 96/41328 describes a computer system including a dual-panel monochrome or color liquid crystal display (LCD). A dynamic random access memory (DRAM) of the computer including a defined virtual memory array representative of pixel locations of the dual-panel LCD. Pixel values are read from the virtual array of the DRAM and written to corresponding locations of the display by a display pipeline. The writing of pixel values to the display proceeds pixel-by-pixel across a row of pixels in a panel, and then to the next row of pixels until a panel is refreshed. The panels of the array are refreshed one at a time alternating between an upper panel of the display and a lower panel of the display. While one panel is being refreshed the other panel is blanked. Consequently, the dual-panel display may be driven with a simplied structure of display pipeline, and with a reduced time requirement for access to the DRAM.

The prior art teaches the use of dual screen monitors and, indeed, lateral withdrawal, but does not teach a sliding withdrawal of such screens on a low friction material bearing surface and with spring-loaded latching for locking the movable screens in retracted as well as in the extended positions. The present invention fulfills these needs and provides further related advantages as described in the, following summary.

SUMMARY OF THE INVENTION

The present invention teaches certain benefits in construction and use which give rise to the objectives described below.

A display apparatus comprises a device enclosure supporting a front panel and a monitor housing supporting a first monitor screen. The monitor housing is pivotally engaged with the device enclosure, and enabled for pivotal movement between a closed position wherein the first monitor screen is approximately parallel to the front panel, and an open position, placing the first monitor screen at an angle to the front panel. A sliding assembly supports plural further monitor screens. The further monitor screens are enabled for sliding movement between concealed positions within the monitor housing and viewing positions lateral to the monitor housing. The further monitor screens are further enabled, when placed in their viewing positions, for pivotal movement relative to the monitor assembly for improved viewing, jointly, of the plural screens.

A primary objective of the present invention is to provide an apparatus and method of use of such apparatus that provides advantages not taught by the prior art.

Another objective is to provide such an invention capable of displaying up to three monitor screens in side-by-side fashion for joint viewing.

A further objective is to provide such an invention capable of storing the screens in a single integral assembly when not in use.

A still further objective is to provide such an invention capable of separate hinged adjustment of each of the sliding screens.

A still further objective is to provide such an invention wherein a sliding screens are enclosed in a removable housing for mounting onto a primary screen housing which is usually a cover for a laptop computer.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 5 is a section through the monitor screen assembly of the invention in the embodiment where one primary screen and one retractable screen is provided;

FIGS. 6–8 are partial elevational views of the monitor screen assembly of the invention showing various means for griping the retractable screen for withdrawal;

DETAILED DESCRIPTION OF THE INVENTION

The above described drawing figures illustrate the invention in at least one of its preferred embodiments, which is further defined in detail in the following description.

Figure 1:
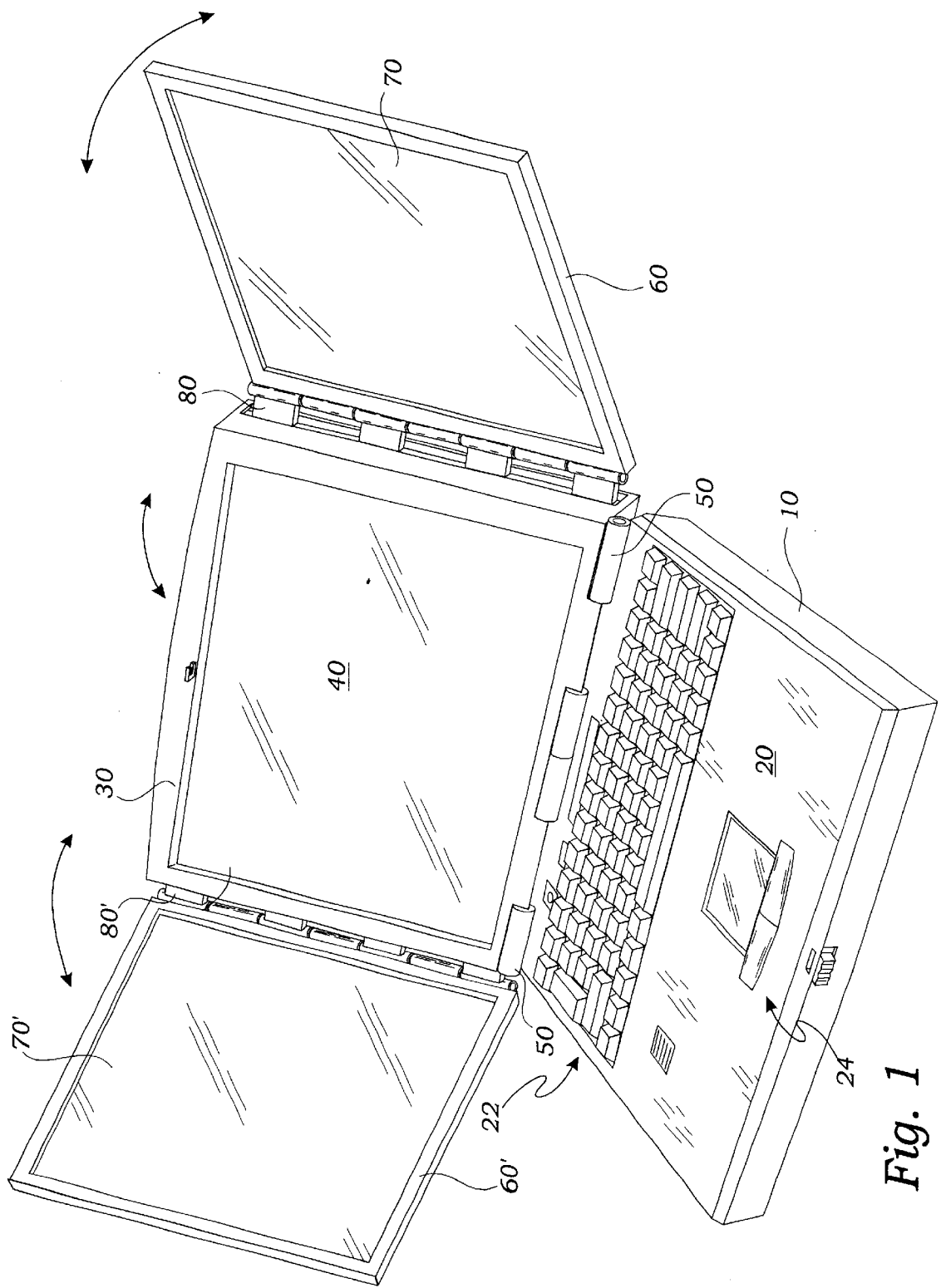
FIG. 1 is a perspective view of a preferred embodiment of the invention showing a set of three monitor screens of the invention with two laterally sliding screens withdrawn from a monitor housing of the invention and including hinges for pivoting the sliding monitor screens toward the viewer.
Figure 2:
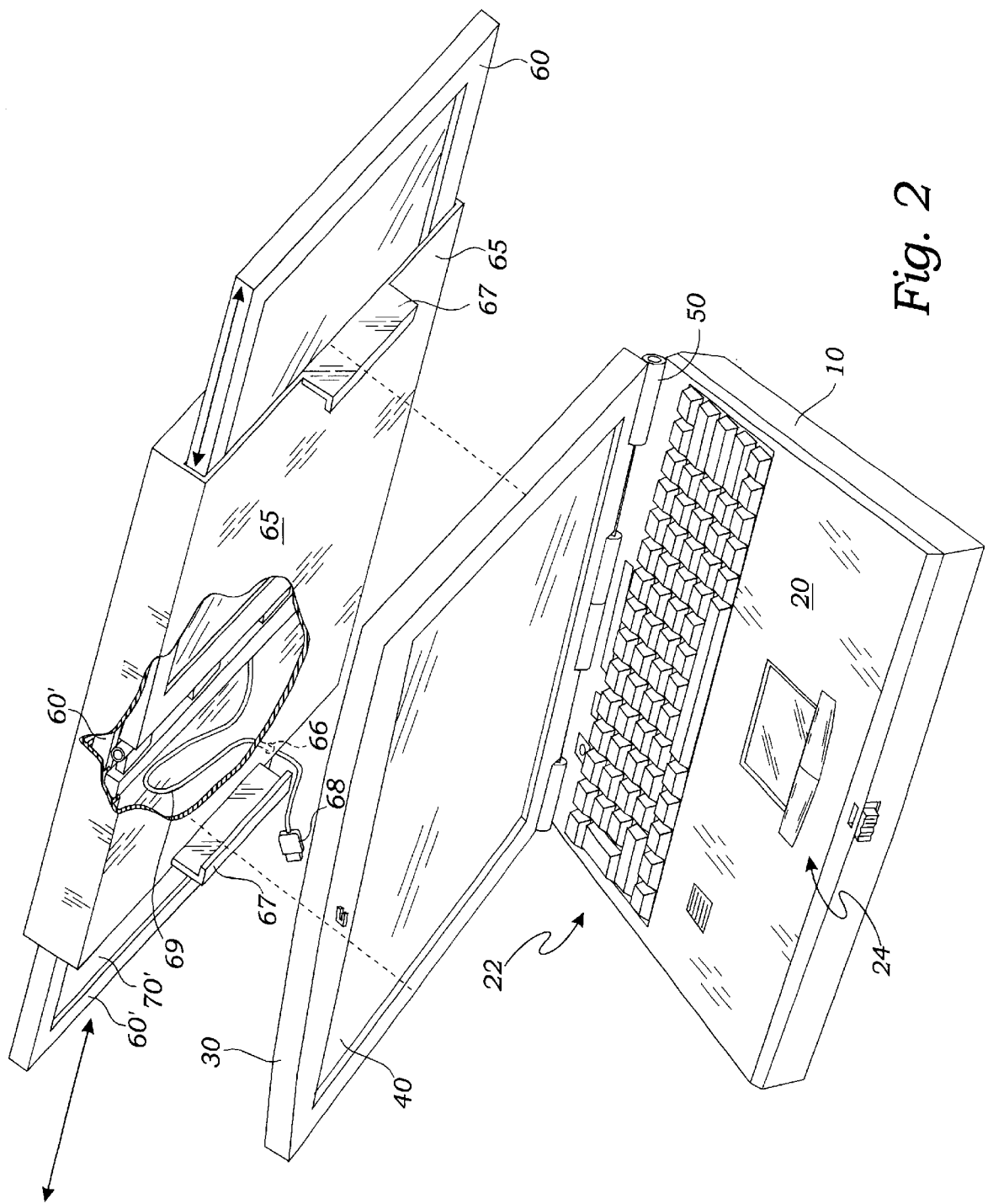
FIG. 2 is a further preferred embodiment thereof, shown as an exploded perspective view, wherein the second and third screens are part of a separable housing (shown partly extended) attachable to the main monitor screen housing or cover of the invention.

The present invention is a display apparatus, and as shown in FIG. 1—1 may be constructed in at least two different versions or embodiments. In a first preferred embodiment, shown in FIG. 1, the apparatus comprises a device enclosure 10 such as the primary case of a laptop computer, as shown, and supported thereon, a front panel 20, as shown, which preferably has a keyboard 22 and other controls 24, as are typical of a laptop computer or similar device well known in the art. A monitor housing 30, typically the cover of the laptop computer, supports a first and primary monitor screen 40 which is pivotally engaged, as is well known in laptop type devices, with the device enclosure 10 using a hinging means 50 of any common type, as shown. Thus, pivotal movement between a closed position (the arced arrow in FIG. 2 shows the monitor housing 30 moving toward the closed position) wherein the first monitor screen 40 may be positioned approximately parallel to the front panel 20 when the computer is not being used, and an open position (FIGS. 1, 3 and 4) wherein the computer is enabled for operation. The open position places the first monitor screen 40 at an angle to the front panel 20 and this angle is typically a right angle or a slightly obtuse angle, as may be convenient for the user in viewing the front panel 20 and the monitor screen 40. A sliding assembly 60 supports a second monitor screen 70. The sliding assembly 60 is enabled for sliding movement within the monitor housing 30, between a concealed position, where it is fully enclosed within the monitor housing 30, and a viewing position, shown in FIG. 1, where the second monitor screen 70 is positioned laterally to the monitor housing 30 for viewing. This is easily accomplished with, for instance, in the present embodiment, Teflon® slides 32 fixed to the top and bottom surfaces of the second monitor screen 70, sliding on Teflon strips 34 fixed to the housing 30. The sliding assembly 60, when in the viewing position, is further enabled by hinge 80 for pivotal movement relative to the monitor housing 30 for improved viewing, jointly, of the first 40 and the second 70 monitor screens. In this embodiment electrical interconnection between the second screen is facilitated in the same fashion as with the first screen, as for instance is taught in present day laptop assembly and interconnection methods well known in the field of this art. The invention may be a simple dumb monitor or may be made as a laptop with dual screens for extended visual use with one or more application software programs as would be easily facilitated by those of skill, as it might use the same techniques as, so-called; "picture-in-picture" know-how, or similar techniques. A third monitor screen 70' may be mounted in a similar fashion as the second screen 70 and may be positioned between screens 1 and 2 or may be positioned behind screen 2. FIG. 6 shows the relationship between these three screens.

Figure 3:
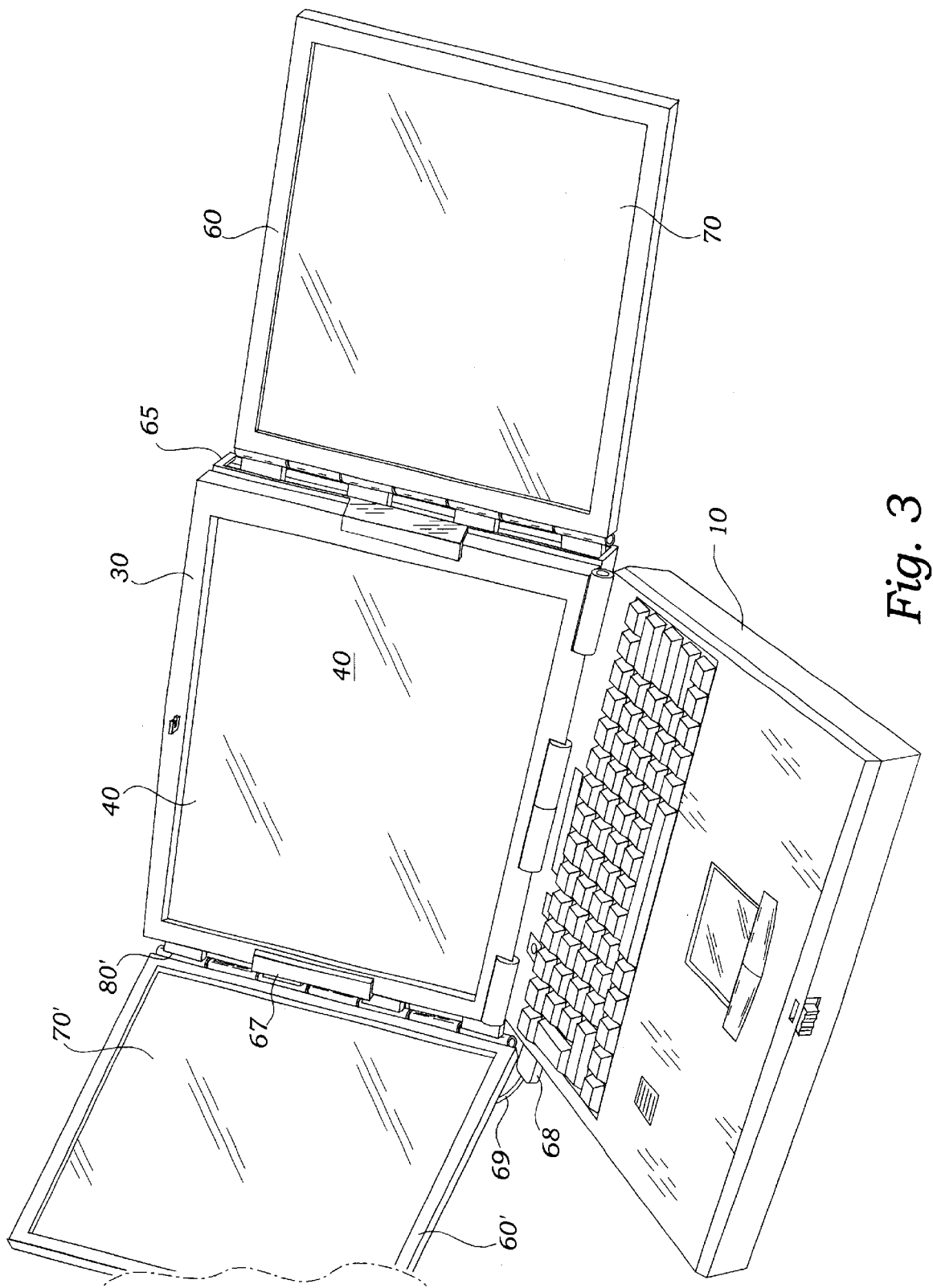
FIG. 3 is a perspective view similar to that of FIG. 1 but showing the right side screen positioned in the plane of the primary screen in preparation for retraction into the cover.
Figure 4:
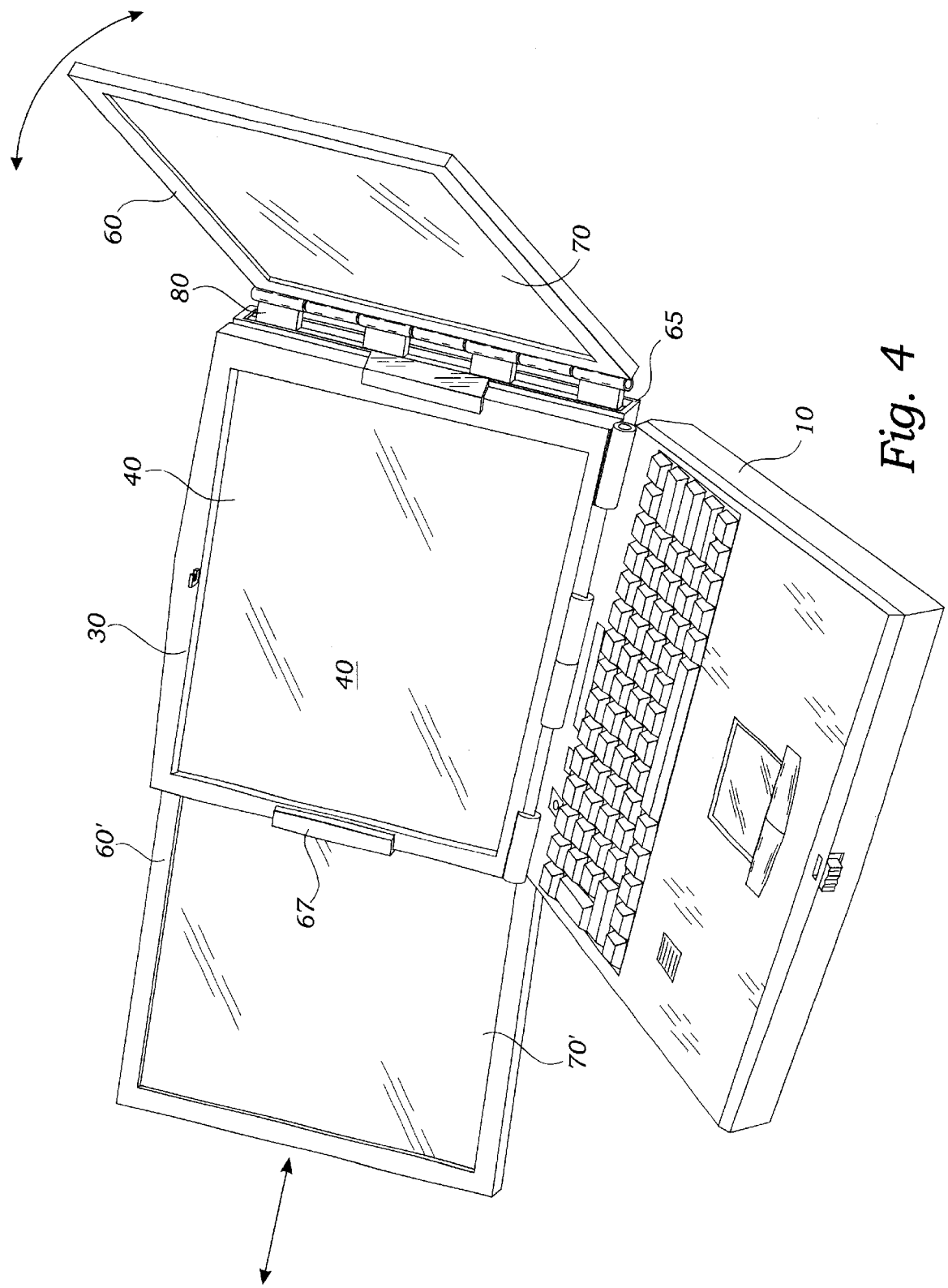
FIG. 4 is similar to FIG. 3 but showing the left side screen partly inserted behind the primary monitor screen.
Figure 9:
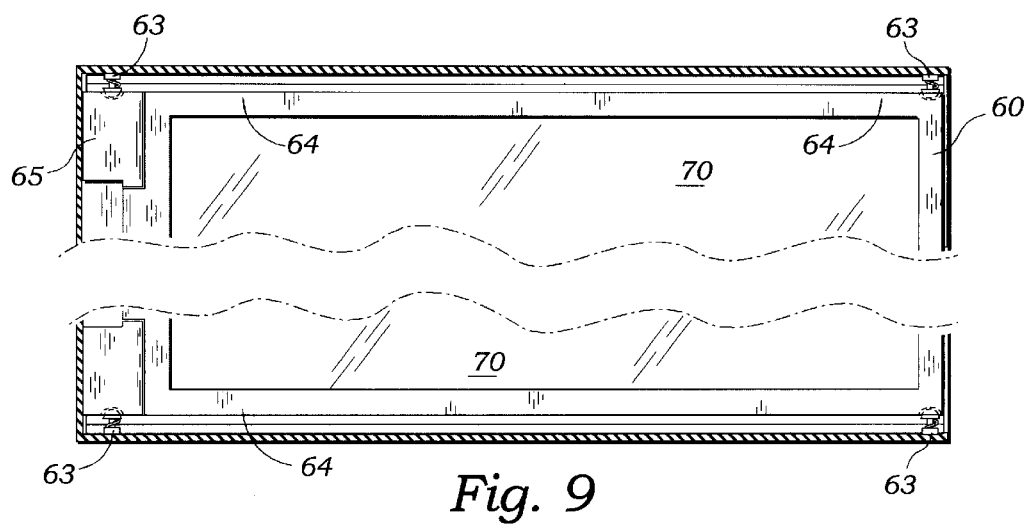
FIGS. 9–11 are partial sectional views of the monitor screen assembly showing one retractable screen in the fully retracted position, partially withdrawn position and fully extended position.

In an alternate embodiment, shown in FIGS. 2–4, the sliding assembly 60 may be a part of a separate device from the monitor housing 30, whereby the sliding assembly 60 is enclosed in a sliding assembly housing 65, best seen in FIG. 2. In this embodiment of the invention, the sliding assembly housing 65 provides edge gripping means 67 for mounting the sliding assembly housing 65 onto the monitor housing 30 as shown in FIGS. 3 and 4. A means for electrical interconnection between the sliding assembly 60 and the device enclosure 10 is also provided. In the preferred embodiment, electrical interconnection between sliding assembly 60 is obtained through snaked cable 69 as shown in FIG. 1. This cable 69 extends from the sliding assembly 60, through an access port 66 on one side of sliding assembly housing 65 and terminates with a connector plug 68 compatible with a connector socket in the device enclosure 10. Clearly, the housing 65 may accommodate one or two screens which are mounted and move in the same manner as described above, i.e., each laterally to one side of the housing 65.

Figure 10:
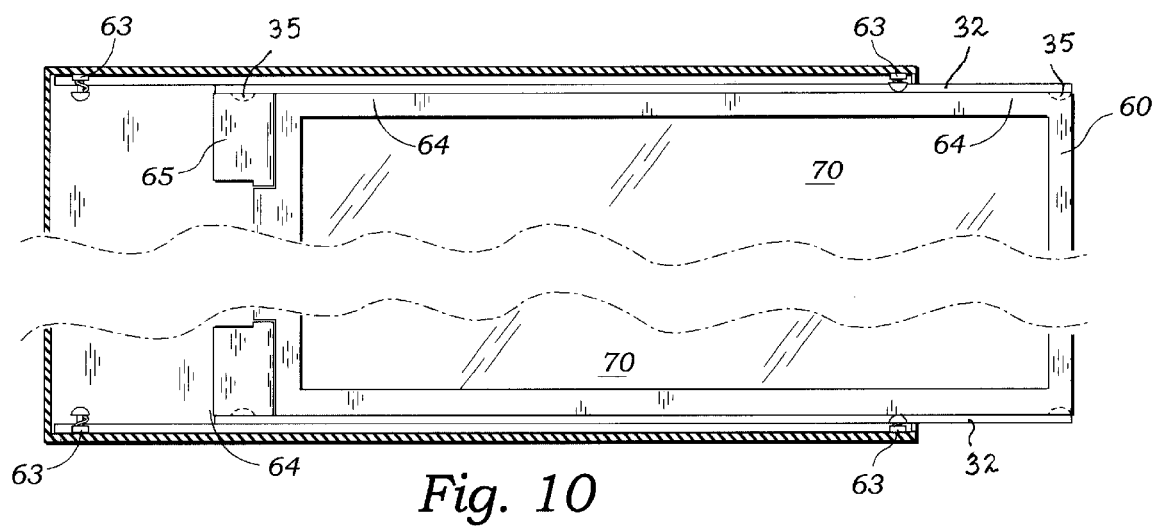
Figure 11:
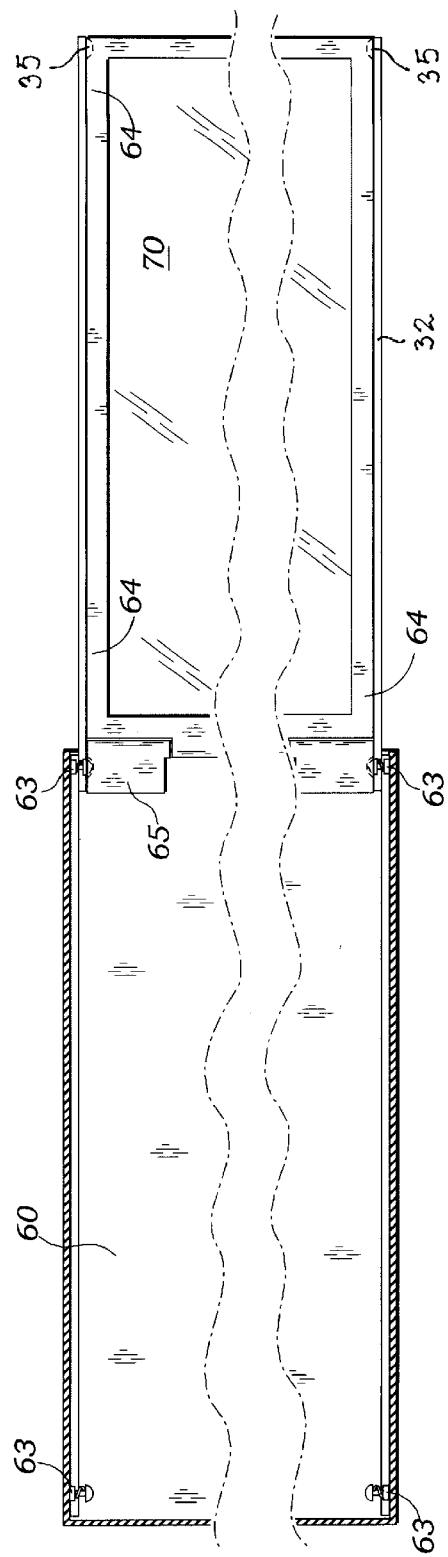
Figure 12:
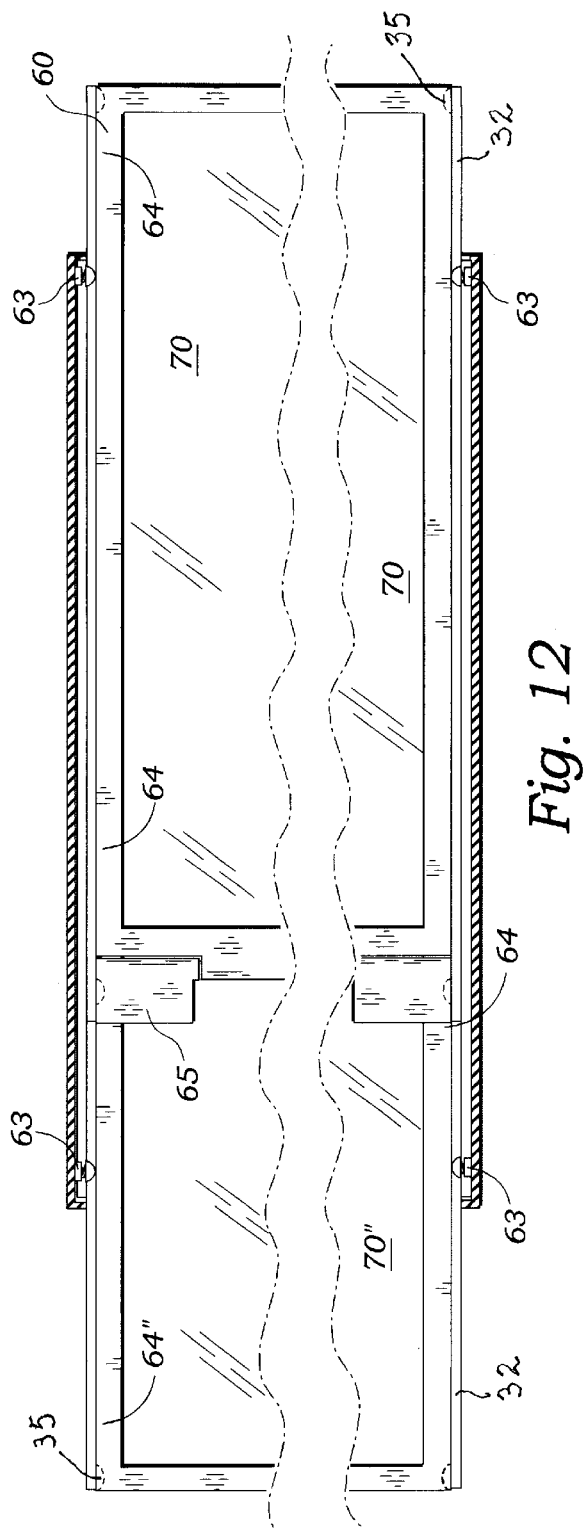
FIG. 12 is a partial sectional view of the monitor screen assembly showing partial withdrawal of both left and right retractable screens.
Figure 13:
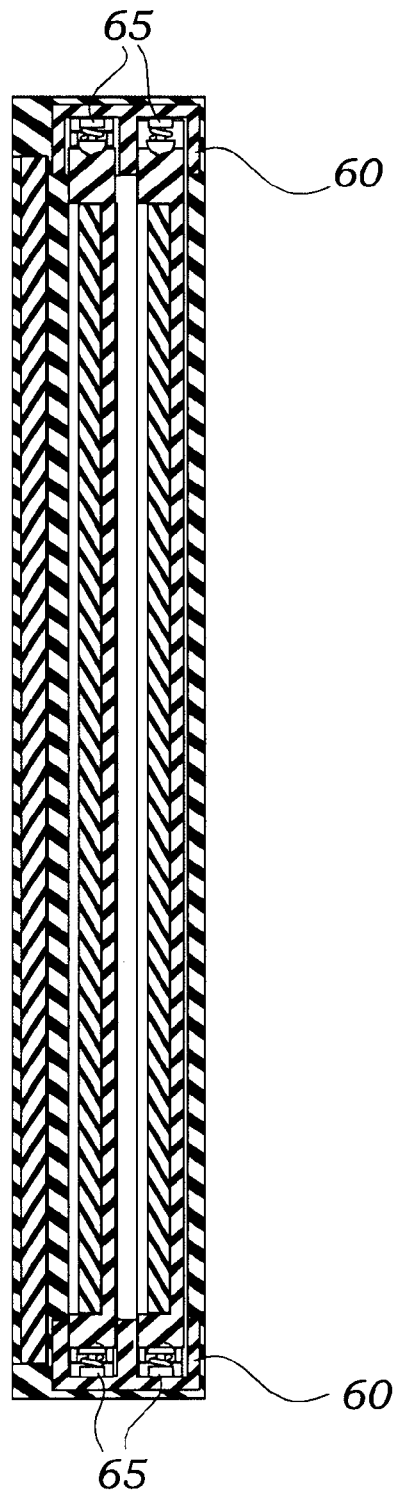
FIG. 13 is a similar to FIG. 5 but showing the case where one primary screen and two retractable screens are provided.

In the preferred embodiment, one or both of the laterally sliding screen assemblies are enabled for locking in the fully retracted position and in the fully extended position as is shown in FIGS. 10 and 11 respectfully. The preferred enablement for accomplishing this is a pair of indentations 35 on each of the top and the bottom of these screens. Likewise, the housing 30 or 65 provides a pair of spring loaded latches 63 on each of the top and the bottom of the sliding screens 70, 70'. When the screens are fully inserted or retracted, the latches 63 are engaged with the indentations 35. It has been found that this arrangement of latches and indentations is critical to the successful operation of the present invention for achieving low manufacturing cost and improved, error free, operation.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A display apparatus comprising: a device enclosure supporting a front panel; and a monitor housing supporting a first monitor screen, the monitor housing pivotally engaged with the device enclosure, and enabled for pivotal movement between a closed position wherein the first monitor screen is approximately parallel to front panel, and an open position, placing the first monitor screen at an angle to the front panel; a sliding assembly supporting a second monitor screen disposed in parallel to, and behind the first monitor screen, the sliding assembly enabled for sliding movement between a concealed position within the monitor housing and a viewing position lateral to the monitor housing enabling viewing of the first and the second monitor screens simultaneously from a common viewing position; the monitor housing providing a first low friction means and the second monitor screen providing a second low friction means, the first and second low friction means in sliding contact for moving the second monitor screen with low effort; a pair of latches engaging indentations in the second monitor screen on an upper and a lower edge thereof for enabling the second monitor screen to be fixedly engaged with the monitor housing when the second monitor screen is in the fully retracted position and when the second monitor screen is in the fully extended position.

2. The apparatus of claim 1 wherein the second monitor screen is enabled, when placed in the viewing position, for pivotal movement relative to the monitor assembly for improved viewing, jointly, of the first and the second monitor screens from a common viewing position.

3. The apparatus of claim 1 wherein the second monitor screen is enclosed in a separable sliding assembly housing, the sliding assembly housing providing edge gripping means for mounting the sliding assembly housing onto the monitor housing and a means for electrical interconnection between the sliding assembly housing and the device enclosure.

4. The apparatus of claim 3 wherein the sliding assembly is enabled, when placed in the viewing position, for pivotal movement relative to the monitor assembly for improved viewing, jointly, of the first and the second monitor screens.

5. A display apparatus comprising: a device enclosure supporting a front panel; and a monitor housing supporting a first monitor screen, the monitor housing pivotally engaged with the device enclosure, and enabled for pivotal movement between a closed position wherein the first monitor screen is approximately parallel to front panel, and an open position, placing the first monitor screen at an angle to the front panel; a sliding assembly supporting a second and a third monitor screens disposed in parallel to, and behind the first monitor screen, the second and a third monitor screens enabled for sliding movement between a concealed position within the monitor housing and a viewing position lateral to the monitor housing enabling viewing of the first, second and third monitor screens simultaneously from a single viewing position; the monitor housing providing a first low friction means and the second and third monitor screens each providing a second low friction means, the first and second low friction means in sliding contact for moving the second and third monitor screens with low effort; a pair of latches engaging each of the second and third monitor screens on an upper and a lower edge of each for enabling the second and the third screens to be fixedly engaged with the monitor housing when the second and the third screens are in the fully retracted position and alternately in the fully laterally extended position.

6. The apparatus of claim 5 wherein the second and the third monitor screens are enabled, when placed in the viewing position, for pivotal movement relative to the monitor assembly for improved viewing, jointly, of the first, second and third monitor screens.

7. The apparatus of claim 5 wherein the second and the third monitor screens are enclosed in a separable sliding assembly housing, the sliding assembly housing providing edge gripping means enabled for mounting the sliding assembly housing onto the monitor housing and a means for electrical interconnection between the second and the third monitor screens in the sliding assembly housing and the device enclosure.

8. The apparatus of claim 7 wherein the second and the third monitor screens are enabled, when placed in the viewing position, for pivotal movement relative to the monitor assembly for improved viewing, jointly, of the first, second and third monitor screens.

* * * * *